Figure 1:
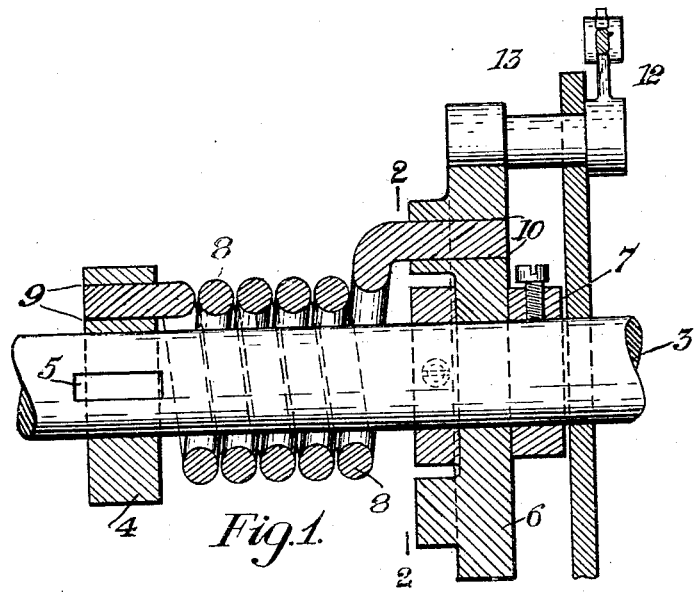

Nov. 1, 1932.  C. A. K. CORNWALL  1,886,169
WHEEL LOCK AND EASY STARTING DEVICE FOR VEHICLES
Filed Jan. 8, 1931

C. A. K. Cornwall
Inventor
by T. L. Boyden
Attorney

Patented Nov. 1, 1932

1,886,169

UNITED STATES PATENT OFFICE

CLEMENT ARTHUR K. CORNWALL, OF VICTORIA, BRITISH COLUMBIA, CANADA

WHEEL LOCK AND EASY STARTING DEVICE FOR VEHICLES

Application filed January 8, 1931, Serial No. 507,424, and in Canada February 12, 1930.

This invention relates to a wheel lock and easy starting device for vehicles and particularly for those of the automobile type—whether trucks or pleasure cars.

Its primary object is to provide a practically instantaneous safety lock to the road wheels when the vehicle is on either an upward or downward gradient and to effect this action by simple, cheap, and robust mechanism.

A further object is to achieve an absolute lock to the road wheels which is also instantly releasable, and in such releasement to aid the restarting of the vehicle by utilizing the accumulated gravitational momentum developed by the vehicle at the moment of being brought to rest, thus greatly facilitating the starting operation both dynamically and mechanically, so that the starting of a car or truck on a stiff up-grade becomes a fool-proof process and a certainty even to a novice, and in effecting it the hands are free to attend to other controls.

The importance of easily starting an automobile after a traffic jam on a steep up-grade is obvious, and ordinarily requires considerable expertness in manœuvring the controls.

With novices it is nerve straining and not infrequently even dangerous, but with my device it becomes identical in simple facility with the starting of a car on the level.

I attain these results by the simple combination of a ratchet wheel and pawl, the latter being actuated to engage the former by a solenoid against the action of a spring. The ratchet wheel being connected to the drive shaft of a vehicle by a powerful spring. The co-operation of these elements is such that the momentum of the vehicle should it commence to back down a steep grade is absorbed by the spring, while it also tends to increase the reaction between the pawl and the ratchet the hold of which against the pull of the vehicle is increased. But as the first increment of forward starting movement reaches the shaft end of the spring, it is augmented by the energy stored in the spring, which while automatically freeing the pawl is also available to assist in the re-starting of the vehicles, which operation is performed practically as though on the level; meanwhile the vehicle is otherwise under normal control requiring no particular adroitness to handle.

It is obvious therefore that my device affords when desired and instantly, a positive lock against a vehicle moving backwards or forwards down a hill, should such movement be undesired. It also provides a valuable forward thrust to the vehicle at the moment of starting from rest up-hill.

While the scope and function of the invention has been broadly traversed in the above statement, it is more clearly described by the aid of the drawing which accompanies and forms a part of this application. These show one definite embodiment of the invention as applied to the central longitudinal drive shaft of an automotive vehicle, it is obvious however that the device lends itself to a considerable variety of application, and it is not intended that the drawing should have any function of limitation, except for matter beyond the scope and language of the claims. In this drawing Fig. 1 is a vertical longitudinal section through the transmission housing of an automobile tire vehicle to which my device has been added, the electric accessories being added in diagrammatic form.

Figure 2:
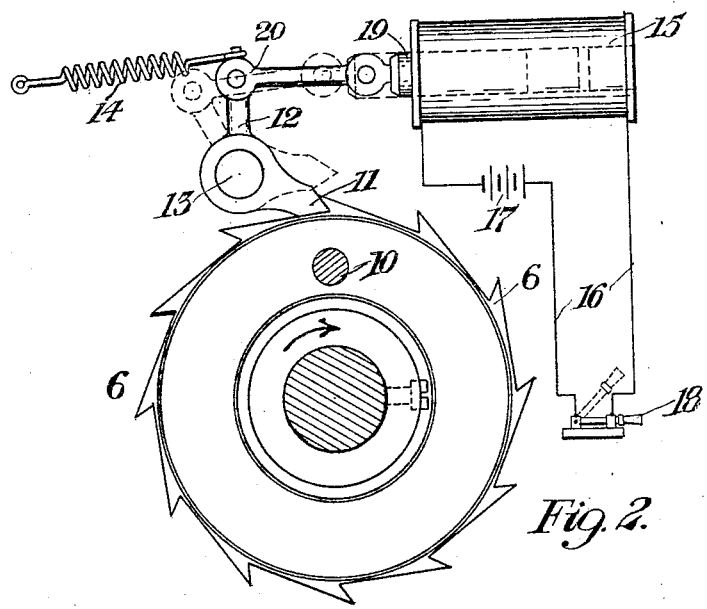

Fig. 2 is a cross sectional elevation on line 2—2 of Fig. 1.

In the drawing the numeral 3 indicates the main central drive shaft through which passes the energy for operating the rear road wheels, a substantial collar 4 is secured to the shaft 3 by the key 5. A ratchet wheel 6 is revolvably carried by the shaft 3 and is retained in position longitudinally by the spring ring 7. Between the ratchet wheel 6 and the collar 4 is positioned encircling the shaft 3 a strong helical spring 8 the extremities of which engage apertures 9 and 10 in the collar 4 and the ratchet 6 respectively. A pawl 11 secured to a short lever 12 pivots on the stud 13 and operates against the tension of the spring 14 whereby it is normally held out of engagement with the ratchet 6 and when the device is not in operation. A solenoid 15 receives energy through the leads 16 from the battery 17 when the switch 18 is in the position indicated. The switch is preferably located on the control board, and may be merely a press button, as its use is but momentary, the solenoid core 19 is connected to the link 20 making connection with the arm of pawl lever 12.

The arrow in Fig. 2 indicates that the clock-wise direction of rotation for the drive shaft 3 viewed from the left is the forward direction for the vehicle.

In operation the device functions as follows:—

Assuming that the vehicle is ascending a gradient, the pawl 11 is held disengaged from the ratchet 6 which revolves idly with the spring 8 and shaft 3 in the direction indicated by the arrow in Fig. 2. Suppose that the vehicle has to be arrested in its ascent owing to a traffic jam. Immediately or shortly before it has come to rest the circuit of the solenoid 15 is closed by the driver's control switch, thus attracting the core and pulling down the pawl 11 into contacting engagement with the ratchet 6, whereby upon any small backward motion of the vehicle the ratchet 6 moving in a direction opposite to that indicated by the arrow is intercepted by the pawl 11, the rear end of the helical spring 8 being carried by the ratchet is also held from revolution, whereby upon any further movement of the vehicle and the shaft 3 to which is secured the forward end of the spring 8, the latter is put under torsional strain until the gravitational momentum of the descending vehicle equals the torsion of the spring 8, when the vehicle comes to rest.

In this position of the mechanism, a positive lock on the drive shaft against further downward movement has been secured, which lock is accentuated by the undercutting of the ratchet teeth and as the spring tightens tends to become cumulative until the pressure against the ratchet teeth is lessened by any slight forward movement, as when the driver again starts to go ahead, when the spring 14 lifts the pawl 11 clear of the ratchet. The re-starting procedure is precisely as though the vehicle were on the level. The usual brakes if applied must be released, the engine started and the power gradually applied to the gearing as usual, instantly as the first increment of this power in the forward direction reaches the ratchet 6 the pawl 11 is released. The power stored in the spring during the down-hill movement becomes available to aid the engine power instantly as the vehicle acquires its momentum and overcomes its inertia.

While the foregoing refers to a vehicle backing down hill, it is obvious that the device has equal applicability to a vehicle running forward downhill by providing a second ratchet wheel having teeth cut in the opposite direction, and arranging the other details to correspond. This adaptation of the invention provides a valuable safeguard to vehicles operating in mountainous country or where steep gradients are prevalent.

Having now fully described my said invention, what I claim and desire to secure by Letters Patent, is:

1. A vehicle wheel lock and easy starting device comprising the combination with a power shaft adapted to drive the road wheel of said vehicle, of a ratchet wheel carried by and revolvable on said shaft, a resilient member encircling said shaft and having one extremity secured to said ratchet wheel and the other extremity secured to said shaft by a suitable intervening member, a pawl adapted to engage the said ratchet against the action of a spring, electrical means opposing said spring and adapted to pull said pawl into engagement with said ratchet, whereby upon any backward movement of said vehicle a corresponding movement is given to said shaft which is resisted by the resilient member and its momentum absorbed by torsional compression of the latter between the ratchet held by the pawl and the shaft until the forces are in equilibrium and the vehicle comes to rest, and whereby when the vehicle is re-started by the engine and the first increment of power in the forward direction reaches the ratchet and releases the pawl the latter is pulled out of contact by its spring and the function of the device has been completed when stored energy of the resilient member has been extended as a forward thrust to aid in starting the vehicle.

2. A vehicle wheel-lock and easy starting device comprising the combination with a central longitudinal drive shaft in connection with the traction wheels of the said vehicle of a ratchet wheel carried by and partially rotatable on said shaft, a resilient member encircling said shaft and having looped extremities adapted to engage a pin, a collar keyed to said shaft and having a projecting pin adapted to engage one of said looped extremities, a pin projecting from the face of the said ratchet wheel and adapted to engage the other said looped extremity, a pivoted pawl adapted to engage the teeth of said ratchet against the action of a spring, a solenoid having its core connected by link members to said pawl whereby the latter is pulled into engagement with the ratchet when the solenoid circuit is closed by the driver, and whereby owing to the undercutting of the ratchet teeth the pawl is held in positive engagement upon any backward motion of the vehicle and cannot be released until a forward motion is applied, and whereby the momentum of the vehicle due to its backward motion is adapted to be absorbed by the said resilient member between the rigidly held ratchet and the moving drive shaft until equilibrium is established and the vehicle comes to rest, and whereby on the instant application of power for the forward direction releasing the ratchet from the pawl the latter is withdrawn from contact with the ratchet by its own spring and so retained until the solenoid is again energized and whereby the energy stored in the resilient member is released as a forward thrust to aid in starting the vehicle.

3. A vehicle wheel-lock and easy starting device comprising the combination with the main drive shaft of said vehicle of a resilient member encircling said shaft, a ratchet wheel carried by and rotatable on said shaft, means connecting one end of said resilient member to said drive shaft, means connecting the other end of said resilient member to said ratchet wheel, means for arresting and holding the said ratchet wheel from rotating with the shaft, whereby the energy delivered through the rotating shaft is absorbed as torsional strain upon said resilient member, and means whereby the absorbed energy may be released as a forward thrust to aid the starting of the vehicle.

In testimony whereof I have hereunto affixed my signature.

CLEMENT ARTHUR K. CORNWALL.